США009624326B2

United States Patent
Kitagawa et al.

(10) Patent No.: US 9,624,326 B2
(45) Date of Patent: Apr. 18, 2017

(54) TETRAFLUOROETHYLENE/PERFLUORO (ALKYL VINYL ETHER) COPOLYMER

(71) Applicant: DUPONT-MITSUI FLUOROCHEMICALS COMPANY, LTD., Tokyo (JP)

(72) Inventors: Hitomi Kitagawa, Shizuoka (JP); Yuji Mochizuki, Shizuoka (JP); Jeong Chang Lee, Shizuoka (JP)

(73) Assignee: DUPONT-MITSUI FLUOROCHEMICALS COMPANY, LTD., Tokyo (JP)

( * ) Notice: Subject to any disclaimer, the term of this patent is extended or adjusted under 35 U.S.C. 154(b) by 0 days.

(21) Appl. No.: 14/409,013

(22) PCT Filed: Jun. 20, 2013

(86) PCT No.: PCT/IB2013/002004
§ 371 (c)(1),
(2) Date: Dec. 18, 2014

(87) PCT Pub. No.: WO2013/190394
PCT Pub. Date: Dec. 27, 2013

(65) Prior Publication Data
US 2015/0191561 A1 Jul. 9, 2015

(30) Foreign Application Priority Data
Jun. 22, 2012 (JP) .................. 2012-140607

(51) Int. Cl.
*C08F 214/26* (2006.01)
(52) U.S. Cl.
CPC .................. *C08F 214/262* (2013.01)
(58) Field of Classification Search
USPC ................................. 526/247, 250
See application file for complete search history.

(56) References Cited

U.S. PATENT DOCUMENTS 4,262,101 A * 4/1981 Hartwimmer ....... C08F 214/262
526/206
4,743,658 A 5/1988 Imbalzano et al.
(Continued)

FOREIGN PATENT DOCUMENTS

EP 1 287 046 B1 7/2007
EP 1287046 B1 * 7/2007
(Continued)

OTHER PUBLICATIONS

PCT International Search Report and Written Opinion mailed Dec. 3, 2013.
(Continued)

*Primary Examiner* — Mark Kaucher
*Assistant Examiner* — Henry Hu
(74) *Attorney, Agent, or Firm* — Keith W. Palmer (57) ABSTRACT

Purpose: To provide a melt-moldable tetrafluoroethylene/perfluoro(alkyl vinyl ether) copolymer with excellent durability without causing an excessive decrease of the melt flow rate and an increase of the perfluoro(alkyl vinyl ether) content. Solution means: A melt-moldable tetrafluoroethylene/perfluoro(alkyl vinyl ether) copolymer, which is characterized in that in a parallel plate mode of a dynamic viscoelasticity measuring device, when the temperature is raised from −40° C. to 200° C. at 5° C./min while fixing the measuring frequency to 1 Hz, the slope (Δ tan δ/ΔT) of the loss tangent (tan δ) measured between two arbitrary points in a range of 50-75° C. and at a temperature difference of 3° C. or higher is always in a range of 0.0005-0.0030, and its preparation method.

6 Claims, 6 Drawing Sheets

(56) References Cited

U.S. PATENT DOCUMENTS

| | | | |
|---|---|---|---|
| 5,932,673 A * | 8/1999 | Aten | C08F 214/262 |
| | | | 526/247 |
| 6,426,386 B2 * | 7/2002 | Lee | C08L 27/18 |
| | | | 525/199 |
| 6,586,546 B2 * | 7/2003 | Iwasaki | C08F 216/1408 |
| | | | 526/207 |
| 8,058,376 B2 | 11/2011 | Aten et al. | |
| 2003/0114615 A1 | 6/2003 | Sumi et al. | |
| 2004/0072935 A1 | 4/2004 | Blong et al. | |
| 2005/0090617 A1 | 4/2005 | Namura | |
| 2007/0106027 A1 * | 5/2007 | Namura | C08L 27/18 |
| | | | 525/199 |

FOREIGN PATENT DOCUMENTS

| | | |
|---|---|---|
| JP | 2004161921 A | 6/2004 |
| JP | 3993018 B2 | 10/2007 |
| WO | 01/98384 A2 | 12/2001 |

OTHER PUBLICATIONS

Lee, Jeong-Chang et al., Miscibility and cocrystallization behavior of two melt-processable random copolymers of tetrafluoroethylene and perfluoroalkylvinylether, Polymer, Elsevier Science Publishers B.V., GB, Jun. 2001, pp. 5453-5461, vol. 42, No. 12.

* cited by examiner

TETRAFLUOROETHYLENE/PERFLUORO (ALKYL VINYL ETHER) COPOLYMER

TECHNICAL FIELD

The present invention relates to a fluororesin with excellent durability for melt molding. More specifically, the present invention relates to a tetrafluoroethylene/perfluoro (alkyl vinyl ether) copolymer with excellent durability.

BACKGROUND TECHNIQUE

Of various kinds of fluororesins, a copolymer (PFA) of tetrafluoroethylene (TFE) and perfluoro(alkyl vinyl ether) (PAVE) has excellent characteristics such as heat resistance, chemical resistance, and purity, it is used in melt-molding of pipes for transfer of various kinds of medicinal fluids, joints for pipe laying, transport containers, storage containers, pumps, filter housings, etc., and lining of pipes made of steel, valves, joints, etc., which are used in the manufacturing processes of chemical plants and semiconductors or liquid crystals.

In addition, the PFA has excellent non-tackiness and is used in coating materials of rolls or belts for fixing images of copying machines or in coating of the surfaces of cooking utensils such as frying pans and rice cookers.

Of the aforementioned usages, in pipes (tubes and hoses) for medicinal fluid transfer, a high-temperature process of using medicinal fluids and a high-speed and high-pressure process of the flow velocity of medicinal fluids have recently been in progress. However, in an environment in which thermal expansion and contraction are repeated, the durability against deformation stresses is insufficient in the conventional well-known PFA, so PFA with higher durability has been in demand. In addition, even in fixers of copying machines, etc., the durability improvement of the PFA has been in demand along with a high-temperature process and a high-speed process of fixing rolls and belts and thinning of PFA coatings.

Several attempts to improve the durability of the PFA have been made up to now (U.S. Pat. No. 5,932,673, Japanese Kokai Patent Application Nos. 2002-3514 and 2004-161921, etc.), which will be mentioned later. However, PFA capable of responding to the demand of the aforementioned durability improvement is not yet proposed in these attempts.

PRIOR ART REFERENCES

Patent References

Patent reference 1: U.S. Pat. No. 5,932,673
Patent reference 2: Japanese Kokai Patent Application No. 2002-3514
Patent reference 3: Japanese Kokai Patent Application No. 2004-161921
Patent reference 4: Japanese Kokai Patent Application No. 2007-131670
Patent reference 5: Japanese Kokai Patent Application Sho No. 62 [1987]-104822
Patent reference 6: Japanese Kokoku Patent No. 3993018
Patent reference 7: U.S. Pat. No. 8,058,376

Non-Patent References

Non-patent reference 1: Fluoroplastics Volume 2, Melt Processible Fluoropolymers Non-patent reference 2: J. C. Lee et al., Polymer 2001, v42, p 5453

OUTLINE OF THE INVENTION

Problems to be Solved by the Invention

These inventors researched the aforementioned problems in earnest to solve them. As a result, the present invention was achieved.

In the present invention, a flex life value is used as an index for evaluating the durability of PFA.

It is known that as the molecular weight of the PFA increases, the melt viscosity of the PFA rises, lowering the melt flow rate (MFR); however, the flex life value increases at that time. In addition, it is also known that the flex life value increases with the increase of the PAVE content of the PFA (non-patent reference 1).

Therefore, the durability of the PFA is improved by lowering the MFR and increasing the PAVE content. However, if the MFR is excessively lowered, melt molding is difficult. On the other hand, if the PAVE content is excessively increased, the PAVE is expensive in addition to the decrease of the properties of the PFA (increase of the gas or medicinal fluid permeability, decrease of the mechanical strength, etc.), so that the PAVE content cannot but be limited to a fixed range.

Therefore, PFA in which the durability is improved in consideration of the MFR and the PAVE content is in demand.

Several attempts to improve the durability of the PFA up to now are shown below.

In the patent reference 1, an attempt to improve the durability is made by using perfluoro(ethyl vinyl ether) (PEVE) instead of the conventional PFA using perfluoro (propyl vinyl ether) (PPVE) as the PAVE. However, the flex life value is 2,400,000 times, which is not the level that meets the improvement of the durability.

In the patent reference 2, the durability improvement of PFA is tested by preparing the PFA in the presence of terpenes such as limonene through aqueous emulsion polymerization. As its effect, a detailed flex life value is not described; however, the flex life value is not at a satisfactory level in the knowledge of the present invention.

In the patent reference 3, using PAVE and PEVE, the improvement of the flexibility and the improvement of the durability are tested by increasing the PEVE content. The maximum value of the flex life value is 6,350,000 times, and although the improvement to some degree is seen, the improvement of the durability is not at a satisfactory level.

In addition, in the patent reference 4, an attempt to improve the durability is made by melt-kneading PFA with a large flex life value and polytetrafluoroethylene (PTFE). However, the flex life value of the using PFA is 1,350,000 at maximum, and the improvement of the durability is not at a satisfactory level.

The present invention provides PFA with excellent durability without causing an excessive decrease of the MFR and an increase of the PAVE content.

The present invention provides PFA with a flex life value, which has not been able to be obtained in conventional PFA, that is, excellent durability.

In addition, the present invention provides a method for preparing PFA with such durability.

Means to Solve the Problems

The present invention provides a melt-moldable PFA characterized in that in a parallel plate mode of a dynamic viscoelasticity measuring device, when the temperature is raised from −40° C. to 200° C. at 5° C./min while fixing the measuring frequency to 1 Hz, the slope (Δ tan δ/ΔT) of the loss tangent (tan δ) measured between two arbitrary points in a range of 50-75° C. and at a temperature difference of 3° C. or higher is always in a range of 0.0005-0.0030.

Here, when the maximum value and the minimum value of Δ tan δ/ΔT that meet the aforementioned conditions are attained, if any of the maximum value and the maximum value is in a range of 0.0005-0.0030, it can be decided that Δ tan δ/ΔT is always in a range of 0.0005-0.0030.

The aforementioned melt-moldable PFA, in which the flex life ratio (its definition will be mentioned later) is 1 or greater, is a preferable embodiment of the present invention.

The aforementioned melt-moldable PFA, in which the PAVE content of the melt-moldable PFA is 1.0-50 wt %, is a preferable embodiment of the present invention.

The aforementioned melt-moldable PFA, in which the MFR is 1-80 g/10 min, is a preferable embodiment of the present invention.

The prevention provides a molded product that is formed by molding the aforementioned melt-moldable PFA.

In the preparation of PFA through emulsion polymerization, the present invention provides a method for preparing the aforementioned melt-moldable PFA characterized in that before 30 wt % of a prescribed amount of TFE, which is supplied to a reaction vessel, is supplied to the reaction vessel, 70 wt % or more of a prescribed amount of PAVE, which is supplied to the reaction vessel, is supplied to the reaction vessel.

Effects of the Invention

According to the present invention, PFA with more excellent durability is provided without causing an excessive decrease of the MFR and an increase of the PAVE content.

According to the present invention, PFA with a flex life value, which could not be obtained in conventional PFA, that is, excellent durability is provided.

The PFA, which is provided by the present invention, has excellent durability in which the flex life ratio is 1 or greater.

Since the PFA, which is provided by the present invention, has excellent durability and melt moldability, it is processed by melt-molding and is useful as a pipe for medicinal fluid transfer or a coating member of fixers of copying machines, etc. In addition, this copolymer is also useful as a raw material of fluororesin paints.

EMBODIMENTS OF THE INVENTION

These inventors discovered that the durability of a PFA, which was characterized in that in a parallel plate mode of a dynamic viscoelasticity measuring device, when the temperature was raised from −40° C. to 200° C. at 5° C./min while fixing the measuring frequency to 1 Hz, the slope (Δ tan δ/ΔT) of the loss tangent (tan δ) measured between two arbitrary points in a range of 50-75° C. and at a temperature difference of 3° C. or higher was always in a range of 0.0005-0.0030, was markedly improved, leading to the completion of the present invention.

The PFA of the present invention is a melt-moldable copolymer that is obtained by the copolymerization of TFE as a main component and PAVE as a comonomer.

In the PFA of the present invention, the PAVE (perfluoro (alkyl vinyl ether), which is used as a comonomer, is also called perfluoroalkoxy trifluoroethylene and can be represented by the following formula (1) or (2).

(Chemical formula 1)

(In the formula, X represents H or F, n represents an integer of 0-4, and m represents an integer of 0-7.)

(Chemical formula 2)

(q represents an integer of 0-3.)

Perfluoro(methyl vinyl ether) (PMVE), perfluoro(ethyl vinyl ether) (PEVE), perfluoro(propyl vinyl ether) (PPVE), etc., are preferable as the PAVE that is used in the present invention. Among them, perfluoro(ethyl vinyl ether) (PEVE) is preferable.

In the present invention, the PAVE content is preferably 1 wt % or more. The lower limit of a more preferable PAVE content is 5 wt %. If the PAVE content is too low, the durability of the resin is lowered, causing difficulty in melt molding.

In addition, the upper limit of a preferable PAVE content is 50 wt %, more preferably 20 wt %. An excessive PAVE content causes an increase of the permeability of gases and medicinal fluids of the PFA or a decrease of the mechanical strength.

Therefore, the PAVE content is 1-50 wt %, preferably 5-50 wt %, and more preferably 5-20 wt %.

The PFA of the present invention may include an additional copolymer comonomer. At that time, the additional comonomer content is preferably lower than the aforementioned PAVE content and less than 1 wt %. Comonomers containing fluorine such as perfluoroalkene with 3-6 carbon atoms, PAVE with 1-6 carbon atoms, chlorotrifluoroethylene, vinylidene fluoride, and vinyl fluoride and comonomers containing no fluorine such as ethylene and propylene are mentioned as examples of the comonomer copolymerizable with the TFE.

The TFE and the PAVE are copolymerized by an emulsion polymerization method in an ordinary aqueous medium. Under the polymerization conditions of a polymerization pressure of 1.0-4.0 MPa and a polymerization temperature of 50-120° C., the TFE and the PAVE as a comonomer are supplied, and the solution is stirred during the polymerization. Here, the copolymerization conditions for obtaining the PFA of the present invention will be described later.

In the PFA obtained by the polymerization, since its polymer terminal group is an unstable terminal group, it is treated with a fluorine gas, thus being able to change the terminal of the polymer chains into —$CF_3$ group. This treatment is called fluorination. With the fluorination, non-tackiness, heat resistance, oil resistance, and chemical resistance can be improved (Japanese Kokai Patent Application No. Sho 62 [1987]-104822, etc.).

The fluorine gas treatment is carried out by bring a fluorine gas into contact with the PFA at a temperature of usually 50-250° C., preferably up to 200° C. for 1-20 h. The pressure may be in a range of 0.0-1.0 MPa, and this treatment is usually carried out at an atmospheric pressure. As the fluorine gas, a pure fluorine gas may be used; however, gases diluted to 2-50 vol % with inert gases such as nitrogen gas, helium gas, and argon gas are preferable in terms of safety.

In the contact with the fluorine gas, the PFA may be any of powder shape, pellet shape, and flake shape. Next, if necessary, the PFA after the fluorination is heat-treated at a temperature of the melting point or lower or re-extracted, so that telomer and oligomer with a low molecular weight which are slightly included in the resin are removed, thereby being able to improve the quality of the PFA.

In consideration of the flowability during the melt molding and the heat resistance and strength for the molded product, the MFR of the PFA in the present invention is in a range of 1-80 g/10 min, preferably 1-50 g/10 min, and more preferably 1-30 g/10 min.

The PFA of the present invention can also include various kinds of fillers in accordance with the usages. Polytetrafluoroethylene having greater than 50 J/g in heat of crystallization, metal powder, metal fibers, carbon black, carbon fibers, silicon carbide, glass fibers, glass beads, glass flakes, graphite, and heat-resistant resins (for example, polyphenylene sulfide, polyimide, polyamideimide, polyether sulfone, polyether ether ketone, aromatic polyamide, etc.) can be mentioned as the fillers.

The PFA of the present invention is characterized in that in a parallel plate mode of a dynamic viscoelasticity measuring device, when the temperature is raised from −40° C. to 200° C. at 5° C./min while fixing the measuring frequency to 1 Hz, the slope ($\Delta$ tan $\delta$/$\Delta$T) of the loss tangent (tan $\delta$) measured between two arbitrary points in a range of 50-75° C. and at a temperature difference of 3° C. or higher is always in a range of 0.0005-0.0030.

The loss tangent tan $\delta$, which is obtained by the dynamic viscoelasticity measurement of the PFA, indicates a state of molecular motion and molecular relaxation of the molecular chains in an amorphous area of the fluororesin as described in the non-patent reference 2. Under a fixed measuring frequency condition, the temperature of the rise of tan $\delta$ curve during the dynamic viscoelasticity measurement of the PFA is a temperature at which the molecular motion and the molecular relaxation start, and the molecular motion and the molecular relaxation are most active at the temperature where tan $\delta$ shows the maximum peak. In other words, the temperature is considered as the glass transition temperature of the PFA.

In addition, in the non-patent reference 2, it is described that the glass transition temperature moves to a low-temperature side in PFA, etc., with a high PAVE content. Moreover, it is also described that if the PFAs (at molecular level) with different PAVE contents were nonuniformly dispersed, two tan $\delta$ peaks appear.

Therefore, in case the maximum peak of the tan $\delta$ curve is not separated into several peaks but appears as a broad single peak, it is considered that the PFAs with different PAVE contents are uniformly dispersed at molecular level. In other words, in the PFA of the present invention, it is presumed that since appropriate dispersion of the PFAs with different PAVE contents at molecular level is achieved, the durability is improved.

The PFA in the present invention is characterized in that in a parallel plate mode of a dynamic viscoelasticity measuring device, when the temperature is raised from −40° C. to 200° C. at 5° C./min while fixing the measuring frequency to 1 Hz, the slope ($\Delta$ tan $\delta$/$\Delta$T) of the loss tangent (tan $\delta$) measured between two arbitrary points in a range of 50-75° C. and at a temperature difference of 3° C. or higher is always in a range of 0.0005-0.0030.

At that time, in the PFA in which the slope ($\Delta$ tan $\delta$/$\Delta$T) of the loss tangent (tan $\delta$) measured between two arbitrary points in a range of 50-75° C. and at a temperature difference of 3° C. or higher is smaller than 0.0005, it is considered that the dispersibility of the PFAs with different PAVE contents is inferior. For this reason, the durability is equivalent to that of the existing PFA, which is not particularly superior.

On the other hand, if in the PFA in which the slope ($\Delta$ tan $\delta$/$\Delta$T) of the loss tangent (tan $\delta$) measured between two arbitrary points in a range of 50-75° C. and at a temperature difference of 3° C. or higher is greater than 0.0030, it is considered that the PAVE of the PFA is more uniformly dispersed, unlike the PFA of the present invention. For this reason, the durability is equivalent to that of the existing PFA, which is not particularly superior.

The PFA of the present invention provided is the PFA with a flex life value, which could not be obtained in the conventional PFA, that is, excellent durability. The PFA provided by the present invention has excellent durability in which the flex life ratio is 1 or greater.

As an index for evaluating the durability of the PFA, the flex life value is commonly used, and the flex life value can be measured as a detailed actual value by a measuring method that will be mentioned later.

It is known that the flex life value is affected by the melt flow rate (MFR) and the PAVE content of the PFA. It is known that an estimated flex life value [FL calc] can be attained by the following relation expression using the PAVE content (wt %) [PAVE] and the melt flow rate (g/min) [MFR]. (For example, it is described in Japanese Kokoku Patent No. 3993018.)

$$Ln[FL\ calc] = B1 - B2 \times Ln[MFR] + B3 \times Ln(PAVE)$$

(Where Ln represents a natural logarithm)

In the present invention, each coefficient of B1, B2, and B3 is calculated based on the conventional well-known PFA, and an estimated flex life value is attained from the following expression. (In the present invention, each coefficient of B1, B2, and B3 uses different values in accordance with the kind of PAVE as a comonomer and the melt flow rate.)

When the PAVE is PEVE,
B1=9.446, B2=1.358, B3=3.552
When the PAVE is PPVE and the MFR is less than 5 g/10 min,
B1=12.983, B2=3.322, B3=2.406
When the PAVE is PPVE and the MFR is 5 g/10 min or more,
B1=12.07, B2=2.48, B3=3.22

The ratio of an actual flex life value, which is obtained by the actual measurement, with respect to an estimated flex life value, which is obtained by the above expression, is defined as "flex life ratio." In other words, if the actual flex life value obtained by the actual measurement with respect to the estimated flex life value [FL calc] is [FL meas], the flex life ratio is given by the following expression.

Flex life ratio=[FL meas]/[FL calc]

The flex life ratio indicates the ratio of the flex life ratio, which is actually measured, to the flex life value that is estimated from an ordinary PFA. Therefore, it can be decided that PFA with a larger flex life ratio has an unexpectedly large flex life value to a flex life value, which is estimated from its MFR or PAVE content, that is, unexpectedly excellent durability. In other words, through the comparison of the values of the flex life ratio of the PFA, the durability of the PFA can be compared without considering the influence of the MFR and the PAVE content.

If this flex life ratio is a durability decision index, the flex life ratio of the PFA of the present invention is 1 or greater. The flex life ratio is more preferably 1.2 or greater.

The PFA of the present invention with excellent durability can be obtained by the following polymerization method, though it is not limited to the method.

In the copolymerization of TFE and PAVE, emulsion polymerization is carried out using an aqueous polymerization medium as a polymerization medium. The polymerization medium is substantially water, and if necessary, a mixed solvent with a small amount of other solvents in the amount of 5 vol % or less may also be adopted.

For the emulsion polymerization, a surfactant is used. As the surfactant, a surfactant can be appropriately selected and used from conventional well-known surfactants. In particular, ammonium perfluorooctanoate (C-8) is appropriate.

A polymerization initiator can also be appropriately selected and used from conventional well-known polymerization initiators without being particularly limited.

As the conditions of the emulsion polymerization, conditions described in the patent reference 1, etc., can be referred to and adopted.

In the emulsion polymerization of the aforementioned PFA, before 30 wt % of a prescribed amount of TFE, which is supplied to a reaction vessel, is supplied to the reaction vessel, 70 wt % or more, preferably 90 wt % or more, and more preferably the total amount of a prescribed amount of PAVE, which is supplied to the reaction vessel, is preferably supplied to the reaction vessel.

Since the PFA of the present invention has excellent durability, for example, it is molded by melt-molding such as melt extrusion molding, injection molding, blow molding, transfer molding, and melt compression molding, and it can be used in pipes for medicinal fluid transfer, joins, medicinal fluid storage containers, or linings of pipes or tanks in semiconductor manufacturing processes or chemical plants.

In addition, since the PFA of the present invention has excellent durability, it is also useful as a raw material of fluororesin paints for forming a fluororesin coating film on a substrate.

In the present invention, each property was measured by the following methods.

(1) Melt Flow Rate (MFR)

Using a corrosion-resistant melt indexer (manufactured by Toyo Seiki Co., Ltd.) with a cylinder, die, and piston based on ASTM D1238-95, 5 g sample was filled in the cylinder held at 372±1° C., held for 5 min, and extruded from a die orifice under a load of 5 kg (piston and weight). At that time, the extrusion rate (g/10 min) of the melted product was attained as MFR.

(2) PAVE Content

After a sample was compressed at 350° C. and cooled with water, the content was attained from an infrared absorption spectrum (nitrogen atmosphere) of the film obtained with a thickness of about 50μ according to the method described in U.S. Pat. No. 5,760,151.

(3) Dynamic Viscoelasticity

After a sample was compressed at 350° C. and cooled with water, a size of 45 mm×12.5 mm (vertical×horizontal) was cut out of the film obtained with a thickness of 0.8-2.0 mm and adopted as a sample for measurement. In a parallel plate mode of a dynamic viscoelasticity measuring device (made by Rheometric Scientific F.E. Co., usually called ARES), the temperature was raised from −40° C. to 200° C. at 5° C./min while fixing the measuring frequency to 1 Hz, and the dynamic viscoelasticity was measured.

(4) Flex Life Value

From a film with a thickness of about 0.19-0.21 mm prepared by melt compression molding at 350° C., a specimen with a length of about 110 mm and a width of 15 mm was cut, mounted at a bending fatigue resistance tester based on the standards of ASTM D-2176, and bent at an angle of horizontally 135° under a load of 1 kg and a speed of 175 times/min. The bending times until the specimen was cut was measured for five specimens, and their average value was adopted as a flex life value.

(5) Flex Life Ratio

The flex life ratio is calculated from an actual flex life value and an estimated flex life value by the method described earlier herein.

(6) Tensile Strength, Tensile Elastic Modulus, and Stretch

The measurements were carried out according to ASTM D-638. Dumbbell-shaped specimens were cut out of a sheet with a thickness of about 1.5 mm prepared by applying melt compression molding at 350° C. to a sample and measured at a tensile speed of 50 mm/min while holding at a sample temperature of 23° C. by using Tensilon made by Orientech K.K.

(7) Differential Scanning Calorimetry (DSC)

The measurement was carried out using a differential scanning calorimeter (Diamond DSC, manufactured by Perkin Elmer, Co.). 10 mg sample was weighed and put into an exclusive aluminum pan, crimped by an exclusive crimper, and housed in a DSC body. The temperature was raised from 140° C. to 360° C. at 10° C./min, held at 360° C. for 1 min, dropped to 140° C. at 10° C./min, held at 360° C. for 1 min, dropped to 140° C. at 10° C./min, held at 140° C. for 1 min, and re-raised up to 380° C. at 10° C./min.

The melting peak temperature (Tm) and the amount of melting heat were attained from a melting curve obtained at the time of the initial temperature rise, the crystallization peak temperature and the crystallization heat were attained from a crystallization curve obtained at the time of the subsequent temperature drop, and the melting peak temperature (Tm) and the amount of melting heat were attained from the melting curve obtained at the time of the second temperature rise. The amount of melting heat and the amount of crystallization heat were respectively attained from peak areas that were determined by connecting a point, at which the curve was separated from a base line, and a point returning to the base line before and after the melting peak and the crystallization peak.

APPLICATION EXAMPLES

Next, the present invention will be explained in further detail by application examples; however, the present invention is not limited at all to these examples.

Application Example 1

A clean vessel with a volume of 845 L made of stainless steel with a horizontal stirring blade was employed as a polymerization vessel. 500 L pure water was charged into the vessel, and oxygen was removed from the system. Next, 1.18 kg ammonium perfluorooctanoate (C-8), 32.3 g ammonium peroxodisulfate (APS), and 31.0 kg PEVE were added to the polymerization vessel, and TFE was introduced to adjust the total pressure to 2.06 MPa. After the start of polymerization, the polymerization was carried out while continuously injecting TFE and 40.4 g APS into the polymerization vessel. The polymerization was carried out at 78° C. and a pressure of 2.06 MPa, and stirring was stopped after a lapse of 2 h, obtaining about 20 wt % PFA dispersion.

The PFA dispersion obtained was stirred and aggregated, so that an aggregate was obtained. Next, the aggregate was dried at 280° C. for 12 h, extruded by a biaxial extruder while holding the resin temperature at 300-340° C., and palletized. Next, the pellet obtained was fluorinated by holding it at 200° C. for 8 h in a diluted fluorine gas at an atmospheric pressure. The properties of the PFA obtained were measured. The results are shown in Table 1.

Figure 1:
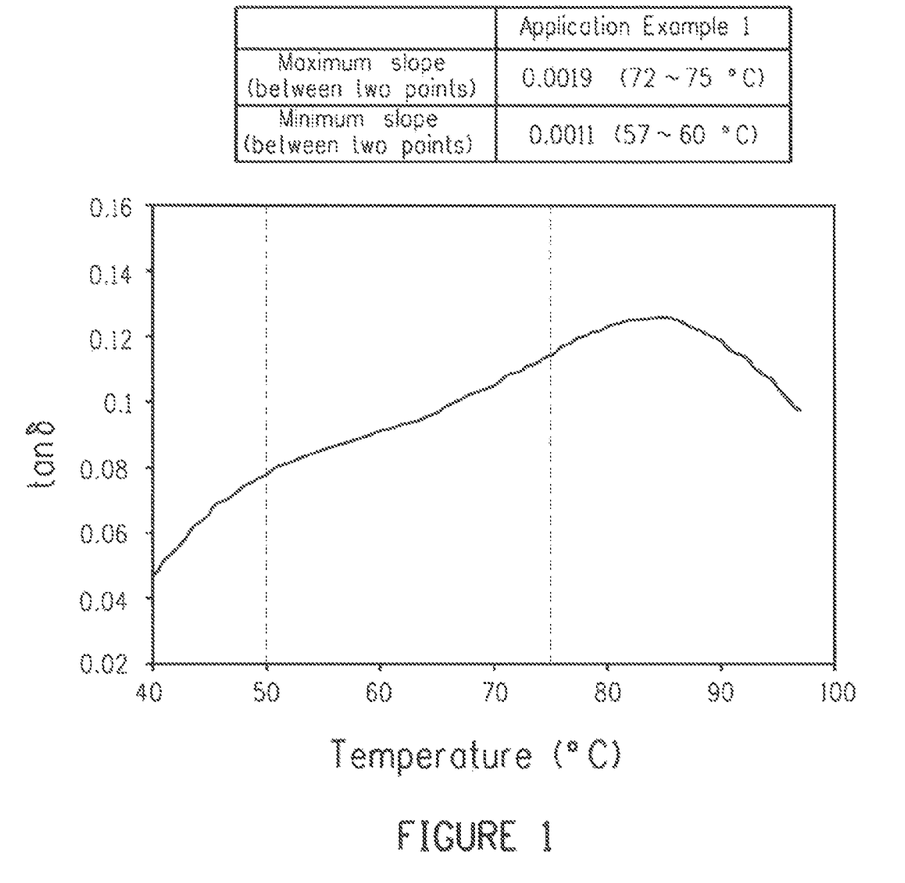
FIG. 1 is a graph showing dynamic visoelasticity measurement results of PFA of Application Example 1.

The result of the dynamic viscoelasticity measurement of the aforementioned PFA obtained is shown in FIG. 1. It is assumed that the tan δ curve is almost linear in a range of 50-75° C. and its slope is also almost constant. If two points in a range of 50-75° C. and at a temperature difference of 3° C. are respectively defined as $T_1$ (° C.) and $T_2$ (° C.) (where $T_2 > T_1$) and the value of tan δ at a temperature of T is F (T), the slope (Δ tan δ/ΔT) is given by the following expression.

$$\Delta \tan \delta / \Delta T = (F(T_2) - F(T_1))/(T_2 - T_1)$$

In FIG. 1, the maximum value of Δ tan δ/ΔT is Δ tan δ/ΔT=0.0019 when $T_1$=72.0° C. and $T_2$=75.0° C. In addition, the minimum value of Δ tan δ/ΔT is Δ tan δ/ΔT=0.0011 when $T_1$=57.0° C. and $T_2$=60.1° C. Therefore, in the PFA obtained in Application Example 1, it was confirmed that the slope (Δ tan δ/ΔT) of the loss tangent (tan δ) between two arbitrary points in a range of 50-75° C. and at a temperature difference of 3° C. or higher was always in a range of 0.0005-0.0030.

Application Example 2

Similarly to the polymerization method of Application Example 1 except for changing the amount of introduction of the PEVE to 28.0 kg, the amount of introduction of the APS before the start of polymerization, and the amount of introduction of the APS after the start of polymerization to 50.6 g, the TFE and the PEVE were copolymerized. The properties of the PFA obtained were measured, and the results are shown in Table 1.

Figure 2:
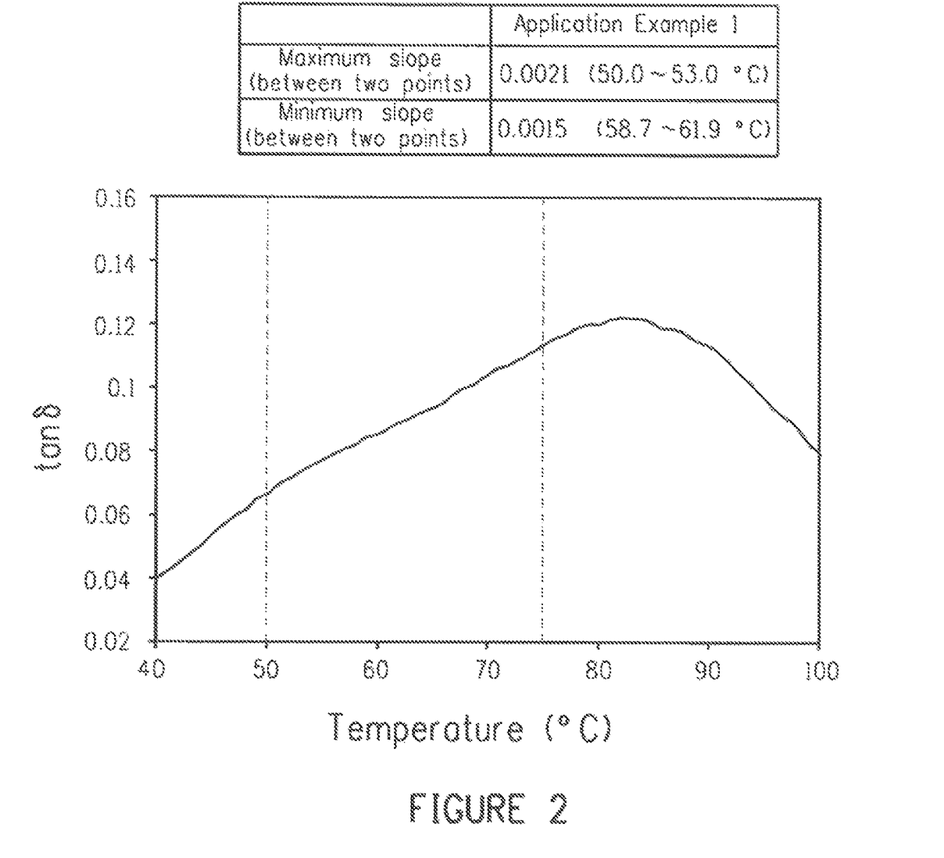
FIG. 2 is a graph showing dynamic visoelasticity measurement results of PFA of Application Example 2.

The result of the dynamic viscoelastic measurement of the PFA obtained is shown in FIG. 2. It is assumed that the tan δ curve is almost linear in a range of 50-75° C. and its slope is also almost constant. Similarly to Application Example 1, when the slope (Δ tan δ/ΔT) of tan δ between two points in a range of 50-75° C. and at a temperature difference of 3° C. or higher was confirmed, the slope was always in a range of 0.0005-0.0030.

Comparative Example 1

A clean vessel with a volume of 3,080 L made of stainless steel with a horizontal stirring blade was employed as a polymerization vessel. 2,087 L pure water was charged into the vessel, and oxygen was removed from the system. Next, 277.5 g ethane, 4.42 kg C-8, 176 g APS, and 41.0 kg PEVE were added to the polymerization vessel, TFE was introduced to adjust the total pressure to 2.40 MPa, and the temperature in the system was stabilized to 70° C. After the start of polymerization, the polymerization was carried out while continuously injecting TFE, 65.3 g APS, and 50.0 g PEVE into the polymerization vessel. The polymerization was carried out at a fixed temperature of 70° C. and a fixed pressure of 2.40 MPa, and stirring was stopped after a lapse of 2 h, obtaining about 30 wt % of PFA dispersion.

This dispersion was dried at 280° C. for 12 h and extruded in a range where the resin temperature did not reach 400° C. Next, the pellet obtained was fluorinated by holding it at 200° C. for 8 h in a diluted fluorine gas at an atmospheric pressure. The properties of the PFA obtained are shown in Table 1.

Figure 3:
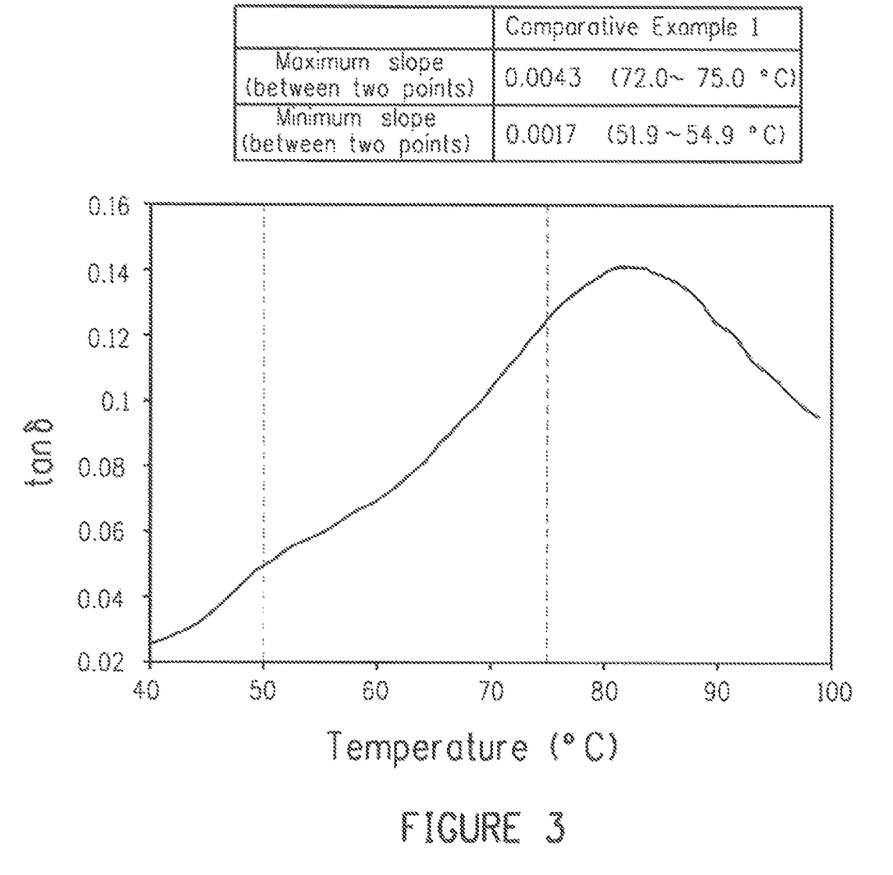
FIG. 3 is a graph showing dynamic visoelasticity measurement results of PFA of Comparative Example 1.

The result of the dynamic viscoelasticity measurement is shown in FIG. 3. From the tan δ curve, it is understood that the slope is slowly increased with the rise of the temperature in a range of 50-75° C. Similarly to Application Example 1, when $T_1$=72.0° C. and $T_2$=75.0° C., the slope (Δ tan δ/ΔT) of tan δ attained was 0.0043, which exceeded 0.0030.

Comparative Example 2

Two kinds of PFAs (PFA (I) and PFA (II)) with different contents, in which PAVE was PEVE, were prepared according to the polymerization sequence of Comparative Example 1.

The PEVE content of the PFA (I) was 22.9 wt %, and the MFR was 3 g/10 min.

The PEVE content of the PFA (II) was 5.8 wt %, and the MFR was 1.8 g/10 min.

25 wt % of the aforementioned PFA (I) and 75 wt % of the PFA (II) were mixed and melt-kneaded at 350° and a rotation speed of 20-50 rotations per minute for 5 min by LABO PLASTOMILL 4C150-01 manufactured by Toyo Seiki, Co., Ltd. The properties of the PFA composition obtained are shown in Table 1.

Figure 4:
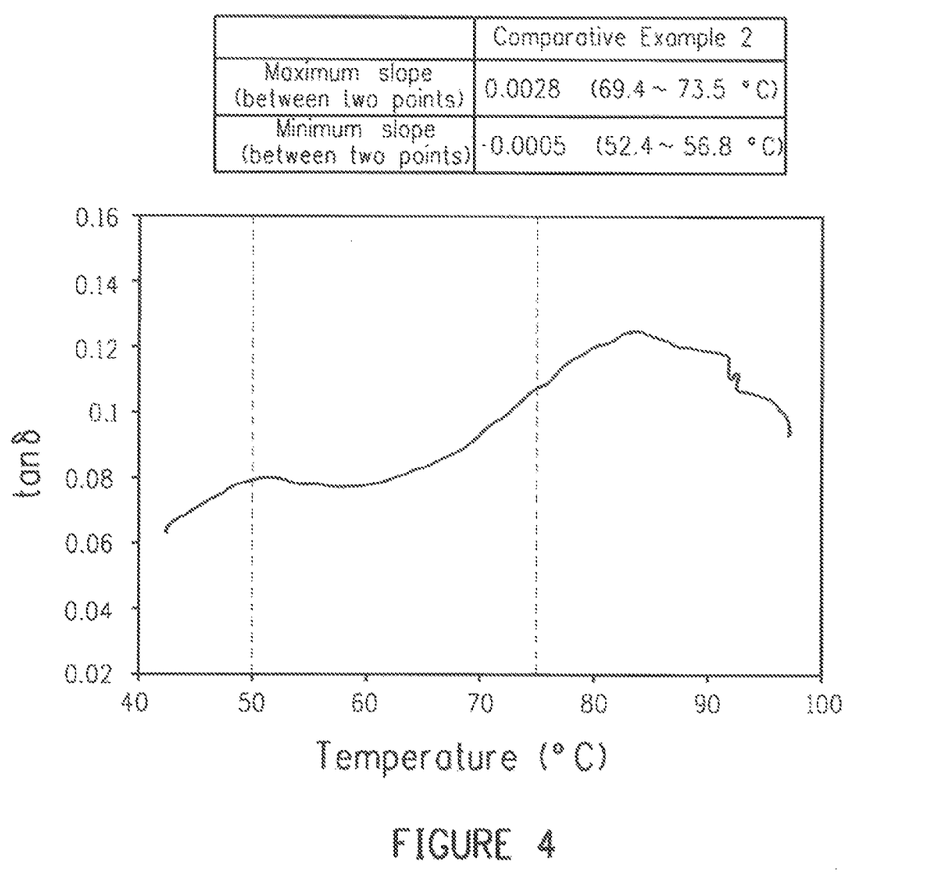
FIG. 4 is a graph showing dynamic visoelasticity measurement results of PFA of Comparative Example 2.

The result of the dynamic viscoelasticity measurement of the PFA composition obtained is shown in FIG. 4. From the tan δ curve, tan δ is once decreased with the rise of the temperature in a range of 50-75° C. and then increased. In other words, the maximum peak of tan δ is separated. Similarly to Application Example 1, when $T_1$=52.4° C. and $T_2$=56.8° C., the slope (Δ tan δ/ΔT) of tan δ attained was −0.0005, which was smaller than 0.0005.

Comparative Example 3

Similarly to Comparative Example 2 except for changing the ratio of PFA (I) and PFA (II) to 35 wt % and 65 wt %, respectively, both of them were mixed and melt-kneaded. The properties of the PFA composition obtained are shown in Table 1.

Figure 5:
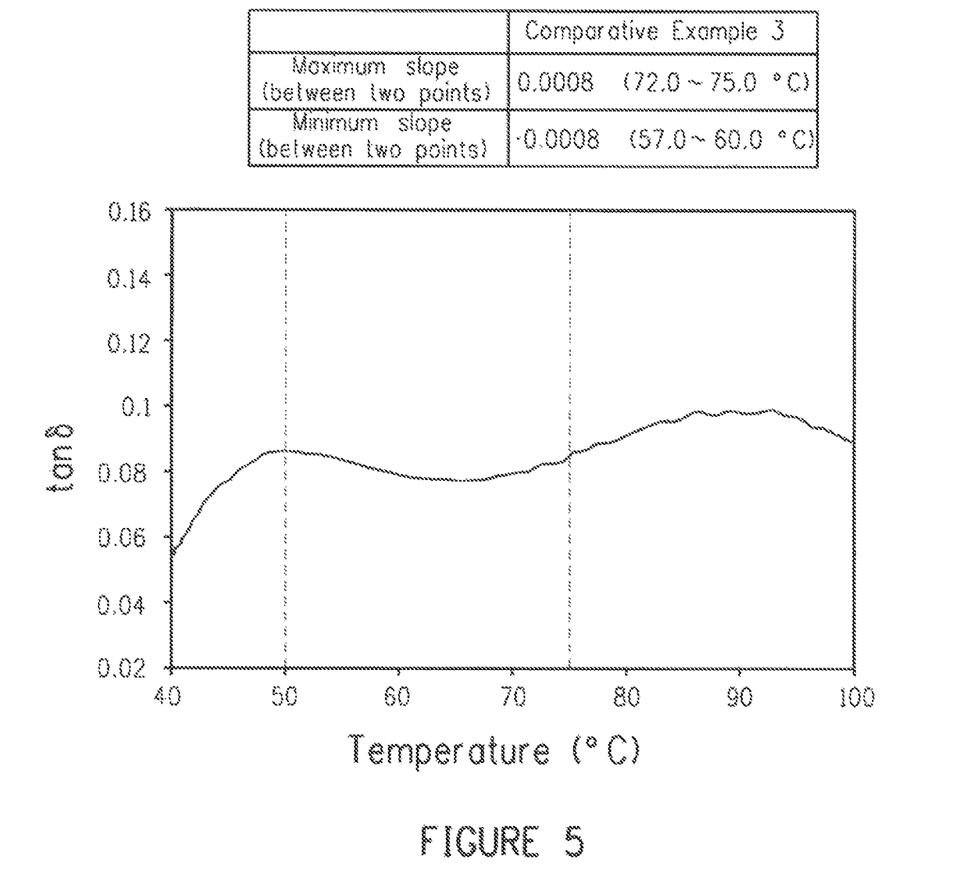
FIG. 5 is a graph showing dynamic visoelasticity measurement results of PFA of Comparative Example 3.

The result of the dynamic viscoelasticity measurement of the PFA composition obtained is shown in FIG. 5. From the tan δ curve, similarly to Comparative Example 2, tan δ is once decreased with the rise of the temperature in a range of 50-75° C. and then increased. In other words, the maximum peak of tan δ is separated. Similarly to Application Example 1, when $T_1=57.0°$ C. and $T_2=60.0°$ C., the slope ($\Delta$ tan $\delta/\Delta T$) of tan $\delta$ attained was −0.0008, which was smaller than 0.0005.

Comparative Example 4

PFA having a core/shell structure, in which PAVE was PEVE, was polymerized according to the method shown in Application Example 1 of U.S. Pat. No. 8,058,376. The polymerization was carried out so that the core was 30 wt %, the shell was 70 wt %, the PAVE content of the core was 15 wt %, and the PEVE content of the shell was 7 wt %. The properties of the PFA obtained are shown in Table 1.

Figure 6:
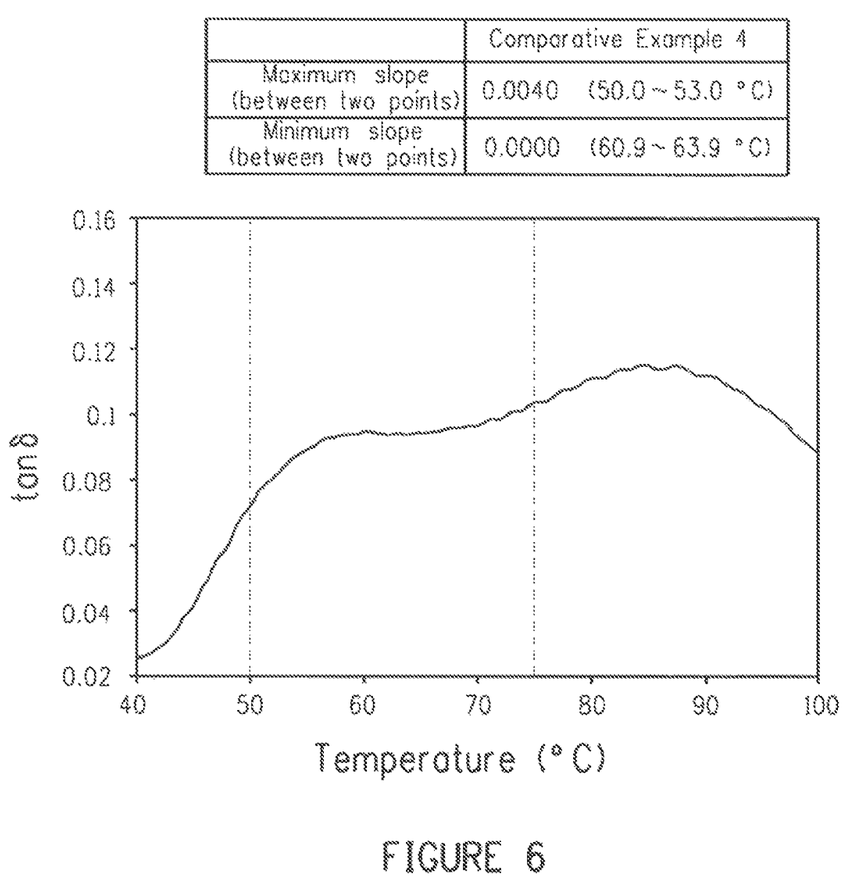
FIG. 6 is a graph showing dynamic visoelasticity measurement results of PFA of Comparative Example 4.

The result of the dynamic viscoelasticity measurement of the PFA obtained is shown in FIG. 6. When $T_1=50.0°$ C. and $T_2=53.0°$ C., the slope ($\Delta$ tan $\delta/\Delta T$) of tan $\delta$ attained was 0.0040, which exceeded 0.0030. In addition, similarly to Application Example 1, when $T_1=60.9°$ C. and $T_2=63.9°$ C., the slope ($\Delta$ tan $\delta/\Delta T$) of tan $\delta$ attained was 0.0000, which was smaller than 0.0005.

TABLE 1

| | | | Application Example 1 | Application Example 2 | Comparative Example 1 |
|---|---|---|---|---|---|
| Melt flow rate (MFR) | | g/10 min | 2.09 | 2.62 | 2.03 |
| PAVE content | | wt % | 10.2 | 9.0 | 6.5 |
| Dynamic viscoelasticity measurement | Storage elastic modulus | 25° C. | 248 MM | 247 MM | 241 MM |
| | | 100° C. | 34 MM | 40 MM | 47 MM |
| | | 150° C. | 19 MM | 23 MM | 27 MM |
| | | 200° C. | 12 MM | 14 MM | 16 MM |
| | Maximum value of $\Delta$tan $\delta/\Delta T$ between two arbitrary points in a range of 50-75° C. and at a temperature difference of 3° C. or higher | | 0.0019 | 0.0021 | 0.0043 |
| | Minimum value of $\Delta$tan $\delta/\Delta T$ between two arbitrary points in a range of 50-75° C. and at a temperature difference of 3° C. or higher | | 0.0011 | 0.0015 | 0.0017 |
| | Is $\Delta$tan $\delta/\Delta T$ always in a range of 0.0005-0.0030? | | Always in the range | Always in the range | Partially out of the range |
| Flex life | Actual value | Estimated value | 25,937,772 | 10,353,962 | 3,487,877 |
| | Cycle times | Estimated value | 17,788,316 | 8,389,999 | 3,734,516 |
| | Flex life ratio | | 1.46 | 1.23 | 0.93 |
| Tensile test | Tensile strength | MPa | 39.3 | 36.4 | 34.0 |
| | Tensile elastic modulus | MPa | 426 | 441 | 412 |
| | Stretch | % | 307 | 306 | 294 |
| DSC | Primary melting | Tm (° C.) | 294.6 | 293.8 | 287.5 |
| | | Amount of melting heat (J/g) | 20.6 | 22.0 | 15.3 |
| | Secondary melting | Tm (° C.) | 300.1 | 297.6 | 294.9 |
| | | Amount of melting heat (J/g) | 17.6 | 18.3 | 14.9 |
| | Cooling | Tm (° C.) | 275.6 | 272.9 | 267.6 |
| | | Crystallization heat (J/g) | −12.2 | −13.3 | −20.3 |

| | | | Comparative Example 2 | Comparative Example 3 | Comparative Example 4 |
|---|---|---|---|---|---|
| Melt flow rate (MFR) | | g/10 min | 2.18 | 3.11 | 1.82 |
| PAVE content | | wt % | 11.0 | 11.3 | 8.5 |
| Dynamic viscoelasticity measurement | Storage elastic modulus | 25° C. | 236 MM | 257 MM | 237 MM |
| | | 100° C. | 35 MM | 46 MM | 39 MM |
| | | 150° C. | 20 MM | 26 MM | 22 MM |
| | | 200° C. | 13 MM | 18 MM | 14 MM |
| | Maximum value of $\Delta$tan $\delta/\Delta T$ between two arbitrary points in a range of 50-75° C. and at a temperature difference of 3° C. or higher | | 0.0028 | 0.0008 | 0.0040 |
| | Minimum value of $\Delta$tan $\delta/\Delta T$ between two arbitrary points in a range of 50-75° C. and at a temperature difference of 3° C. or higher | | −0.0005 | −0.0008 | 0.0000 |
| | Is $\Delta$tan $\delta/\Delta T$ always in a range of 0.0005-0.0030? | | Partially out of the range | Partially out of the range | Partially out of the range |
| Flex life | Actual value | Estimated value | 13,337,326 | 1,017,620 | 9,036,147 |
| | Cycle times | Estimated value | 22,108,067 | 14,731,312 | 11,232,198 |
| | Flex life ratio | | 0.60 | 0.07 | 0.80 |
| Tensile test | Tensile strength | MPa | 27.8 | 32.9 | |
| | Tensile elastic modulus | MPa | 483 | 444 | |
| | Stretch | % | 245 | 275 | |
| DSC | Primary melting | Tm (° C.) | 298.1 | 313.2 | 304.7 |
| | | Amount of melting heat (J/g) | 16.2 | 18.1 | 26.4 |
| | Secondary melting | Tm (° C.) | 299.1 | 313.7 | 296.7 |
| | | Amount of melting heat (J/g) | 15.1 | 20.2 | 13.7 |
| | Cooling | Tm (° C.) | 273.5 | 288.8 | 281.4 |
| | | Crystallization heat (J/g) | −16.1 | −20.3 | −26.0 |

In Application Examples 1 and 2, the slope ($\Delta \tan \delta/\Delta T$) of the loss tangent ($\tan \delta$) between two arbitrary points in a range of 50-75° C. and at a temperature difference of 3° C. or higher is always in a range of 0.0005-0.0030, the flex life ratio is 1.2 or greater in both of them, and the durability is greatly improved.

In Comparative Example 1, the slope ($\Delta \tan \delta/\Delta T$) of the loss tangent ($\tan \delta$) between two arbitrary points in a range of 50-75° C. and at a temperature difference of 3° C. or higher partially exceeds 0.0030, the flex life ratio is smaller than 1, and the durability is not improved. In Comparative Examples 2 and 3, the slope ($\Delta \tan \delta/\Delta T$) of the loss tangent ($\tan \delta$) between two arbitrary points in a range of 50-75° C. and at a temperature difference of 3° C. or higher deviates from 0.0005-0.0030, the flex life ratio is smaller than 1 in both of them, and the improvement effect of the durability cannot be seen.

In Comparative Example 4, the slope ($\Delta \tan \delta/\Delta T$) of the loss tangent ($\tan \delta$) between two arbitrary points in a range of 50-75° C. and at a temperature difference of 3° C. or higher deviates from 0.0005-0.0030, the flex life ratio is smaller than 1, and the improvement effect of the durability cannot be seen.

INDUSTRIAL APPLICABILITY

According to the present invention, PFA with more excellent durability can be obtained without causing an excessive decrease of the MFR and an increase of the PAVE content.

The PFA that is provided by the present invention is PFA with excellent durability which could not be obtained in conventional PFA.

The PFA is processed by melt-molding and is useful as a pipe for medicinal fluid transfer or a coating member of fixers of copying machines, etc. In addition, this copolymer is also useful as a raw material of fluororesin paints.

The invention claimed is:

1. A melt-moldable tetrafluoroethylene/perfluoro(alkyl vinyl ether) copolymer, characterized in that in a parallel plate mode of a dynamic viscoelasticity measuring device, when the temperature is raised from −40° C. to 200° C. at 5° C./min while fixing the measuring frequency to 1 Hz, the slope ($\Delta \tan \delta/\Delta T$) of the loss tangent ($\tan \delta$) measured between two arbitrary points in a range of 50-75° C. and at a temperature difference of 3° C. or higher is always in a range of 0.0005-0.0030, said copolymer being further characterized in that the flex life ratio of said copolymer is 1 or greater, wherein said flex life ratio is represented by the expression [FL meas]/[FL calc], wherein: FL meas is the measured flex life of said copolymer, and wherein FL calc is given by the expression

Ln[FL calc]=$B$1−$B$2×Ln[MFR]+$B$3×Ln[PAVE], wherein [MFR] is the measured melt flow rate of said copolymer in g/10 min, and [PAVE] is the measured weight percent content of said perfluoro(alkyl vinyl ether) in said copolymer, and wherein coefficients B1, B2, and B3 depend on said perfluoro(alkyl vinyl ether) comonomer and said copolymer melt flow rate as follows: when said perfluoro (alkyl vinyl ether) of said copolymer is perfluoro(ethyl vinyl ether), then B1=9.446, B2=1.358 and B3=3.552; when said perfluoro(alkyl vinyl ether) of said copolymer is perfluoro (propyl vinyl ether) and said copolymer melt flow rate is less than 5 g/10 min, then B1=12.983, B2=3.322, B3=2.406; and when said perfluoro(alkyl vinyl ether) of said copolymer is perfluoro(propyl vinyl ether) and said copolymer melt flow rate is 5 g/10 min or more, then B1=12.07, B2=2.48, B3=3.22.

2. The melt-moldable tetrafluoroethylene/perfluoro(alkyl vinyl ether) copolymer of claim 1, characterized in that the perfluoro(alkyl vinyl ether) is a compound represented by the following Chemical formula (1) or (2):

Chemical formula 1:

wherein n represents an integer of from 0-4, and m represents an integer of from 0-7, Chemical formula 2:

wherein q represents an integer of from 0-3.

3. The melt-moldable tetrafluoroethylene/perfluoro(alkyl vinyl ether) copolymer of claim 1, characterized in that the perfluoro(alkyl vinyl ether) is perfluoro(ethyl vinyl ether) or perfluoro(propyl vinyl ether).

4. The melt-moldable tetrafluoroethylene/perfluoro(alkyl vinyl ether) copolymer of claim 1, characterized in that the perfluoro(alkyl vinyl ether) content of the melt-moldable tetrafluoroethylene/perfluoro(alkyl vinyl ether) copolymer is 1.0-50 wt %.

5. The melt-moldable tetrafluoroethylene/perfluoro(alkyl vinyl ether) copolymer of claim 1, characterized in that the melt flow rate of the melt-moldable tetrafluoroethylene/ perfluoro(alkyl vinyl ether) copolymer is 1-80 g/10 min.

6. A molded product that is obtained by molding the melt-moldable tetrafluoroethylene/perfluoro(alkyl vinyl ether) copolymer of claim 1.

* * * * *